United States Patent [19]
Heth

[11] 3,754,500
[45] Aug. 28, 1973

[54] LAWN DEBRIS CHOPPER AND COMPACTOR

[75] Inventor: Sherman C. Heth, Sturtevant, Wis.

[73] Assignee: Jacobsen Manufacturing Company, Racine, Wis.

[22] Filed: Feb. 22, 1972

[21] Appl. No.: 228,157

[52] U.S. Cl. .................... 100/97, 100/53, 100/100, 100/215, 100/229
[51] Int. Cl. ............................................ B30b 15/08
[58] Field of Search ................. 100/53, 94, 95, 100, 100/215, 226, 96, 97, 229

[56] References Cited
UNITED STATES PATENTS

| | | | |
|---|---|---|---|
| 2,691,338 | 10/1954 | Robbins | 100/97 |
| 3,537,390 | 11/1970 | Hinkel | 100/100 |

Primary Examiner—Billy J. Wilhite
Attorney—Arthur J. Hansmann

[57] ABSTRACT

A lawn debris chopper and compactor having a hopper for receiving grass clippings, leaves, tree branches, and the like, and directing the debris onto a feeder in the form of a conveyor and a feeder roller which move the debris to a chopper or cutter. The feeder and the chopper are driven by the motor, and motor controls cut the power to the mechanism when too much debris is being fed in or when the access door to the machine is opened. A compactor is in debris-flow communication with the chopper to receive the cut debris and compress it in a receptacle which is removable from the machine. A motor switch is activated by the presence of the receptacle for operating the entire mechanism, and the entire mechanism is enclosed in a housing and is shown to be supported on a portable chassis.

3 Claims, 4 Drawing Figures

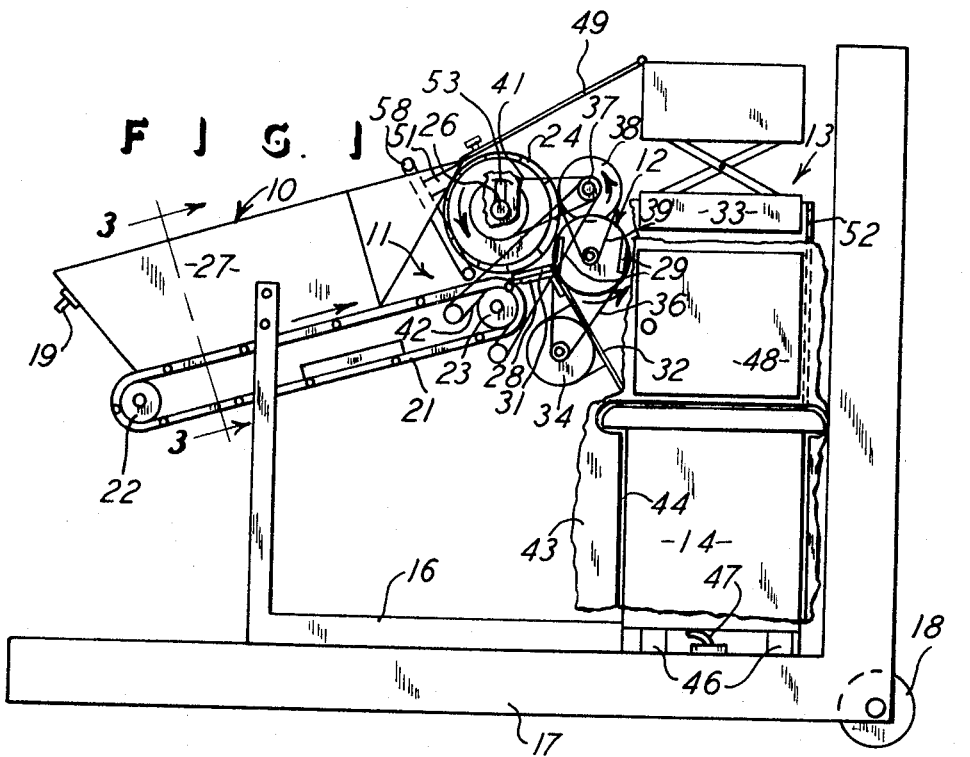
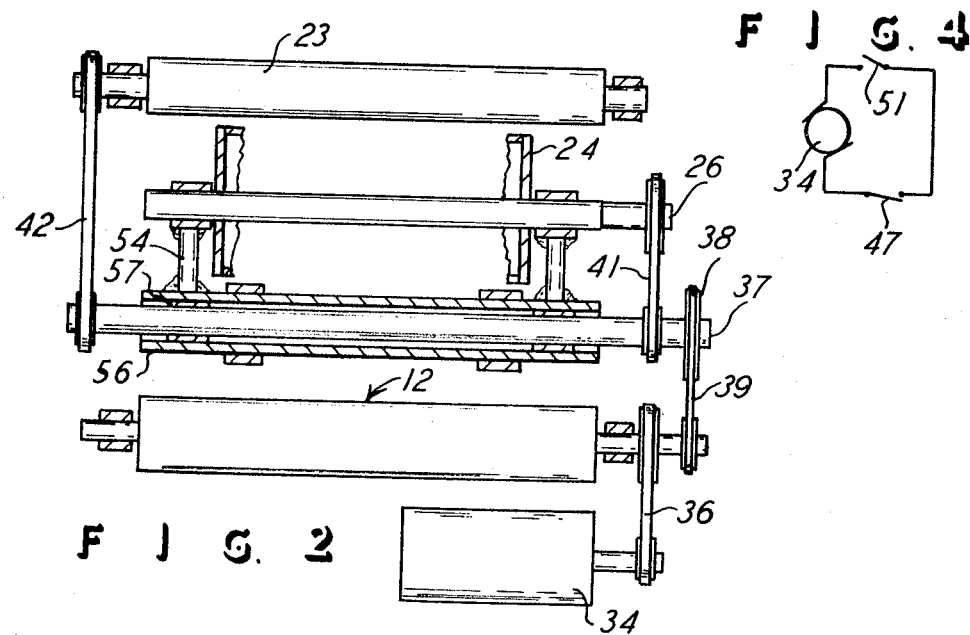
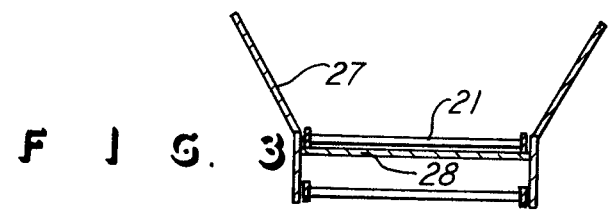

LAWN DEBRIS CHOPPER AND COMPACTOR

This invention relates to a lawn debris chopper and compactor and, more explicitly, it relates to a lawn debris chopper and compactor which receives grass clippings, leaves, tree branches, and like debris which is dumped into the machine and which is then chopped into small particles and is compressed into a receptacle.

BACKGROUND OF THE INVENTION

This invention is concerned with minimizing the size of storage space required for lawn debris, and it is becoming more and more a problem in providing ample storage space and in collecting and disposing of such debris. This is a problem for both the owner of the property as well as for the municipality or other entity concerned with the pick-up and discarding of the collected debris, such as grass clippings.

With regrad to the present invention, it has been determined that simply cutting grass clippings in very small particles can double the compaction factor as compared to compacting clippings of a size normally cut say with rotary lawn mowers of the various makes and sizes in common use today. Such fine or small particles of grass clippings can be compacted to one-eighth of their original bulk, and, in so settling, more air is excluded from the pile and, with the clippings in a plastic or like container folded over, the clippings ferment but do not develop any consequential heat and all the odor is confined. That is, a pile of clippings from an ordinary rotary mower in use today, compared to clippings which are finally cut into small particles and which are then compacted, according to this invention, occupy eight times the space of the chopped and compacted clippings.

With tree leaves, it has been determined that the compactability is even greater, compared to grass. In this case, by cutting the leaves into smaller particles, the original pile is reduced to one-fifth size. By cutting and then compacting, according to this invention, the original pile is reduced to one-sixteenth of its size.

Accordingly, it is a primary object of this invention to provide a lawn debris chopper and compactor which is efficient in its operation in reducing the bulk of lawn debris, and to package or store the debris in a suitable receptacle. In accomplishing this object, the machine of this invention is made in a manner which is sufficiently feasible and practical to be commercially acceptable and to be of a structure and value which is likely to be attractive to the average homeowner.

Another object of this invention is to provide a combined machine of a lawn debris chopper and compactor structure which is portable and which has a hopper for easy dumping of the debris and which has a receptacle for final containment of the debris.

A further object of this invention is to provide a machine of the aforementioned type and having the aforementioned objectives and which is arranged with safety type switches which are self-operating when the operator opens an access door and when the operator removes the receptacle from the machine.

Another object of this invention is to provide a lawn debris chopper and compactor which has an automatically operative overload switch such that the machine will stop when an excessive amount of debris is fed into the machine.

Other objects and advantages will become apparent upon reading the following description in light of the accompanying drawings.

BRIEF DESCRIPTION OF THE DRAWINGS

FIG. 1 is a side elevational view of the machine of this invention, showing parts broken away and with some diagramatic showing.

FIG. 2 is a schematic view of the moving parts and the drive mechanism therefor.

FIG. 3 is a sectional view taken along the line 3—3 of FIG. 1.

FIG. 4 is a wiring diagram of a part of the electric circuit which may be used.

DETAILED DESCRIPTION OF THE PREFERRED EMBODIMENT

The drawings generally show the machine to consist of a hopper 10, a debris feeder 11, a chopper 12, a compactor 13, and a receptacle 14. The entire machine is shown to be supported on a frame 16 which retains the various components in the respective positions shown in FIG. 1. Also, a portable chassis 17, having a wheel 18, may be employed for mobily supporting the entire machine, and a handle 19 is provided for the operator to guide the movement of the entire machine along the ground.

It will therefore be understood by one skilled in the art that lawn debris, such as grass cuttings, leaves, tree branches, and the like can be fed into the machine by dumping them into the hopper 10 and they are then moved to the chopper 12 where they are cut into fine particles and are guided into the receptacle 14 where they are compressed by the compactor 13.

The feeder 11 includes the endless conveyor 21 which is supported on the spaced-apart rotatable supports 22 and 23 which are suitably supported in the machine in any convenient and conventional manner. The feeder 11 also includes the rotatable drum or member 24 which is rotatably mounted in the machine by its drum shaft 26. Thus, it will be understood, that the debris emptied into the hopper 10 is guided by the hopper walls 27 onto the conveyor 21 which moves the debris to the feeder drum 24. The drum 24 can be moving at a higher surface speed so that it uniformly feeds the debris to the chopper 12. Thus the debris moves along the support or surface 28 to the chopper 12 which is shown to be a rotatable type cutter having cutter blades 29 which act with the shown bed knife 31 to chop or cut the debris and cause the cut debris to move along the surface 32 and into the receptacle 14. The compactor 13 then has a press head 33 which moves downwardly onto the debris and compresses the debris in the receptacle 14 to compact the debris to only a fraction of its original bulk.

An electric motor 34 is also mounted on the machine and it drives the chopper 12 through a drive belt 36. In turn, a jack shaft 37 is rotatably mounted on the machine and supports a sheave or the like 38 which is engaged by the belt 39 coming from the chopper shaft, as shown. In turn, a drive belt 41 extends from the jack shaft 37 to the feeder drum 24. Finally, a drive belt 42 extends from the jack shaft 37 to the conveyor rotatable support 23. With the several belts mentioned and described, it will be understood that the drive extends from the motor 34 and to the chopper 12 and the feeder drum 24 and the feeder conveyor 21, in conventional manners and as mentioned and as more clearly shown in the drawings.

Further, FIG. 2 schematically shows the arrangement of the various rotatable elements described in connection with FIG. 1, and it shows the supporting shafts and pulleys or sheaves on the shafts and the rollers or drums over the shafts, as will be clearly understood in connection with the word description and observing of FIGS. 1 and 2. FIG. 2 is an exploded view similar to a section taken through the axes of each of the rotatable members shown in the view. That is, it will be noticed that the rotatable elements described are shown to have respective rotatably mounted shafts, and sheaves thereon, so the rotatable elements move in the direction of the arrows shown adjacent those elements 12, 38, and 24. Also, the conveyor 21 moves in the direction of the arrow shown thereabove, and it moves over the floor 28, as seen in FIGS. 1 and 3.

The mechanism is enclosed in a housing 43 which has an opening 44 through which the receptacle 14 can be inserted and withdrawn for positioning the receptacle 14 in line with the discharge from the chopper 12 and in line with the compressing head 33 of the compactor 13. The receptacle 14 may contain a plastic bag liner, of the well-known type, and the receptacle 14 itself may otherwise be of a rigid material to contain the debris against the force of the compactor 13 for achieving the substantial reduction in size of the debris, as mentioned at the outset of this document. Also, the receptacle 14 can rest on a floor or guides 46, and a pressuresensitive switch 47 is disposed below the receptacle 14 to be actuated by the presence of the receptacle 14. Electric wires can extend from the switch 47 and to the motor 34 for closing the electric circuit to the motor, and for opening the same to the motor, when the receptacle is in place and removed, respectively. That is, without the receptacle 14, the switch 47 is open and the motor 34 will not operate, and this is a safety feature as well as of course avoiding the discharge of the debris when the receptacle is absent.

Also, the housing 43 has an access door 48 which may be opened by the operator for inspection and cleaning and the like, and again a safety switch can be arranged, in any conventional manner, in connection with the opening and closing of the door 48, as well as with another door 49, so that the closing of the electric circuit relative to the motor 34 can be under the control of another switch 51, as shown in FIG. 4, such that when either door 48 or 49 is open, the switch 51 is open and the motor 34 will then not be running.

FIG. 1 further shows a chute or guiding passageway 52 extending in the machine from the compactor 13 and the chopper 12 and down to the receptacle 14. Thus, the debris is continuously flowing or moving from the hopper 10 and to the receptacle 14 and through the various parts mentioned, and the surfaces, such as 27, 28, 32, and 52, provide the flow communication of the debris sequentially from element to element in the machine.

The drawings further show that the feeder roller 24 is movably mounted by virtue of its shaft 26 being disposed in a slot 53 in the machine housing 43. Thus the shaft 26 can move upwardly from the position shown in FIG. 1, and such movement could be induced by an abundance of the debris moving below the feeder roller 24. FIG. 2 shows that the feeder roller 24 is supported on arms 54 secured to a sleeve 56 piloted on the jack shaft 37. Thus, the shaft 37 has bearings 57 which pivotally support the sleeve 56, so the arms 54 can pivot about the axis of the shaft 37 and thus permit the up and down floating motion for the feeder drum 24, within the limits of the slot 53. When the drum 24 has risen to a pre-determined elevation, it can then be in a position to activate a switch, such as the switch 51, and such activation may be in any conventional manner, and by means of the safety bar 58 which is displaced by the raising of the feed roller 24. Again the electric circuit to the drive motor 34 would then be interrupted when the feed roller 24 has raised to its pre-determined elevation, and this would cause the entire machine to stop operating until the abundance of debris can be cleared in the machine.

The invention therefore is shown to include the components of the feeder 10, with the uniform feeding feature and the automatic safety shut-off feature mentioned, and it includes the chopper 12 and the compactor 13 and the receptacle 14, all in debris flow communication with each other for serving the purposes which should now be well understood by one skilled in the art, as well as he would understand the construction and arrangement of the components described or would be able to manufacture such components, from the drawings and word descriptions given herein.

It should also be again noted that the chopper 12 is in the form of a cylindrical member with cutter blades 29, and the arrangement is such that the blades act against the bed knife 31 and chop the debris to small or fine particles. That is, this type of chopper will not simply cut the debris in only large particles, and it will not simply pull the debris through the machine and dump it into the receptacle, but instead it will chop the debris into fine particles and the circumference of the chopper 12 will permit the passage of only the cut particles of the debris to assure that the debris is cut into small and fine particles.

What is claimed is:

1. A lawn debris combined chopper and compactor machine comprising a hopper for receiving debris dumped therein, a debris feeder in debris-flow communication with said hopper for guiding the debris from said hopper, a chopper in debris-flow communication with said feeder for receiving the debris and reducing the sizes of the particles thereof by cutting the debris, a receptacle in debris-flow communication with said chopper for receiving the cut particles moving from said chopper and being movable away from said chopper, a compactor operably disposed adjacent said chopper and said receptacle and movable toward and away from said receptacle for compacting the cut debris in said receptacle, a housing enclosing said feeder and said chopper and said compactor and having debris-guiding surfaces extending adjacent said feeder and said chopper and said compactor for guiding sequential flow of the debris between the aforesaid parts, said housing having an opening therein for the removal of said receptacle from said machine, a motor operatively connected to said chopper for powering said chopper, and a rotatable member operatively connected to said motor and being disposed adjacent said chopper and above the debris moving to said chopper, for connecting the debris and directing it to said chopper.

2. The combined chopper and compactor as claimed in claim 1, wherein said rotatable member is displaceably mounted for upward movement under the force of the quantity of the debris.

3. The combined chopper and compactor as claimed in claim 1, wherein said feeder includes a movable conveyor and said rotatable member for respectively upwardly supporting the debris and engaging the debris on the top thereof, and drive means operatively connected from said motor to each of said conveyor and said rotatable member for rotating said rotatable member at a speed sufficient to have said rotatable member move the debris faster than said conveyor moves the debris.

* * * * *

UNITED STATES PATENT OFFICE
CERTIFICATE OF CORRECTION

Patent No. 3,754,500          Dated August 28, 1973

Inventor(s) Sherman C. Heth

It is certified that error appears in the above-identified patent and that said Letters Patent are hereby corrected as shown below:

In Claim 1, Column 4, line 64, change "connecting" to -- contacting --.

Signed and sealed this 22nd day of January 1974.

(SEAL)
Attest:

EDWARD M. FLETCHER, JR.      RENE D. TEGTMEYER
Attesting Officer              Acting Commissioner of Patents

UNITED STATES PATENT OFFICE
CERTIFICATE OF CORRECTION

Patent No. 3,754,500    Dated August 28, 1973

Inventor(s) Sherman C. Heth

It is certified that error appears in the above-identified patent and that said Letters Patent are hereby corrected as shown below:

Column 2, line 53, after "downwardly", insert -- , by any conventional mechanism, including those shown in U. S. Patents Nos. 2,691,338 and 3,537,390, --.

In Claim 1, at Column 4, line 64, change "connecting" to contacting --.

This certificate supersedes Certificate of Correction issued January 22, 1974.

Signed and sealed this 24th day of September 1974.

(SEAL)
Attest:

McCOY M. GIBSON JR.
Attesting Officer

C. MARSHALL DANN
Commissioner of Patents